2,894,927

IMPROVED FILM-FORMING LATEXES OF CHLO-ROETHYLENE COPOLYMERS AND PROCESS FOR PREPARING SAME

Max E. Elder, Midland, Roland E. Gunderman, Clare, William G. MacPherson, Bay City, and Clarence D. Parker, Gladwin, Mich., assignors to The Dow Chemical Company, Midland, Mich., a corporation of Delaware No Drawing. Application November 1, 1956
Serial No. 619,669

5 Claims. (Cl. 260—29.6)

This invention relates to improved latexes capable of forming continuous coherent films. More particularly it relates to latexes which deposit films having improved drying characteristics.

Polymer latexes are valuable means for fabricating continuous coherent articles, such as films, foils, coatings and the like. Among the useful latexes are those of the alkyl acrylate esters copolymerized with a haloethylenic monomer such as vinyl chloride or vinylidene chloride. Although certain of the latter latexes have a useful family of properties for forming films, they have never achieved their full potential because of the difficulty of drying and fusing the cast latex films. That difficulty arises from the close proximity of the fusion and drying temperatures. In one technique of preparing such films a wet latex film is formed by deposition on a supporting surface and then is dried into a continuous, coherent film. In an alternative procedure the latex is cast onto a supporting surface which has been wetted with a coagulant solution to produce a coherent porous coagulum which is washed, dried, and finally fused. When the acrylate-haloethylene copolymers of this invention are employed in either procedure the proximity of the fusion and drying temperatures causes some fusion at the surfaces of the film before the water in the center of the film has had a chance to volatilize or to diffuse to the surface, leaving entrapped residual water in the film. It has been found that the films may be dried by conventional drying means to a water content of about 6 to 7 percent but that the above mentioned difficulty precludes the removal of that last aqueous residuum. It has been further found that the drying difficulty is particularly significant with those copolymers containing at least 10 percent by weight of acrylate ester and that the problem is less prevalent with those copolymers having a lesser concentration of acrylate.

It is accordingly the principal object of this invention to provide a process for preparing improved film-forming aqueous latexes of copolymers of a haloethylene monomer with an acrylic monomer.

It is a further object to provide a process for preparing such latexes which have improved drying characteristics when deposited as films on supporting surfaces.

The above and related objects are achieved by means of a process comprising as sequential steps forming a first latex by the emulsion polymerization of a monomeric material comprising a haloethylene monomer and an acrylic monomer wherein the acrylic monomer is present in an amount of at least 10 percent of the weight of combined monomers, and thereafter dispersing in said first latex additional monomeric material having less than 10 percent by weight of acrylic monomer, and subjecting the resulting latex to polymerization conditions to copolymerize the so introduced monomers.

As haloethylene monomers may be used either vinyl chloride or vinylidene chloride. As acrylic monomers it is intended to include acrylonitrile, alkyl acrylic esters, and alkyl methacrylic esters. These monomeric materials may be combined in certain proportions to yield normally crystalline and orientable copolymers and in other proportions to yield predominantly amorphous copolymers. The monomeric ratios of this invention are such that the first monomeric material results in an amorphous or only partially crystalline copolymer and the second monomeric material results in a crystalline copolymer. It has been found that the coagulating and drying characteristics of each of the above types of copolymer are vastly different and the process of this invention uses that discovery to improve the latexes. When a latex of a copolymer prepared from a haloethylene monomer and less than about 10 percent of an acrylic monomer is continuously coagulated on a supporting surface, the resulting coagulum is a highly porous film-like structure which is highly permeable to air, steam, and the like. That porosity is believed to be due to the hardness of the copolymer particles forming the latex, and that hardness is dependent ultimately upon the chemical composition of the particles. Such a porous coagulum is easily dried by radiation, forced air, or other conventional drying technique. In contrast, when a latex of a copolymer prepared from a haloethylene monomer and more than about 10 percent of an acrylic monomer is continuously coagulated on a surface, the resulting coagulum is relatively non-porous and consequently impermeable to the passage of air, steam, and similar drying media. In this latter instance the absence of porosity is believed due to the relative softness of the polymer particles which causes the coagulum to be sintered by the coagulation mechanism itself. This softness is likewise dependent upon the chemical composition of the copolymer particles. Such a sintered coagulum is difficult to dry since only the surface of the coagulum is subject to the drying means and the moisture in the central part of the coagulum must be brought to the surface by diffusion.

Although it is unnecessary that the monomers used in each polymerization be identical in composition it is imperative that they be compatible if useful films are to be produced. It is preferred, however, to employ the same monomers in each polymerization but in different proportions to provide copolymers of different crystallinity.

The formation of aqueous latexes of polymeric materials is well known in the art. Typically the monomeric materials are dispersed into an aqueous phase containing a water-soluble polymerization catalyst, such as potassium persulfate, and a surface active agent capable of emulsifying the monomeric materials in water. Examples of suitable emulsifiers are the soluble salts of long chain alkyl sulfates or sulfonates, petroleum hydrocarbon sulfonates, and the like. The polymerization is usually carried out by heating the aqueous emulsion at temperatures of about 40° to 60° C. with agitation. After polymerization is substantially complete the latex is filtered to remove any precoagulum. It is a common practice to add a small amount of surface active agent to the latex following polymerization to stabilize it to mechanical shear.

Latexes which are to be used in forming continuous coherent articles, such as films, should preferably contain from about 30 to about 50 percent by weight of non-volatile solids. When less than about 30 percent by weight of non-volatile solids are present in the latex, no useful, continuous, coherent articles can be produced by simple deposition of the latex. Latexes having appreciably more than 50 percent by weight of non-volatile solids are difficult to prepare and are extremely sensitive to mechanical shear which may cause premature coagulation.

It is also known that the quality of dried, continuous, coherent articles prepared by the deposition of a latex is dependent upon the latex particle size. The particle size is a function of the kind and concentration of emulsifier, the temperature of polymerization, and rate of agitation used in forming the initial dispersion. Latexes of the polymers of this invention will generally not form a film by simple deposition unless substantially all of the particles are under 3000 Angstrom units in diameter. Most desirable results are obtained when the majority of the dispersed polymer particles have diameters between 400 and 1800 Angstrom units. Means for making latexes whose particles are of those dimensions are known.

In addition it is a common technique in the latex casting art to incorporate some additives into a latex before casting. Thus, plasticizers may be added by stirring in the plasticizer itself or an emulsion of the plasticizer in water. Pigments, stabilizers and other solid additives may be dispersed by passing the formulated latex through a colloid mill, homogenizing device, or similar apparatus. It is also common practice to add a small amount of a hydrophilic colloidal substance to thicken the aqueous phase and thereby to improve the casting properties of the latex. When using the latexes of haloethylene polymers the pH of the latex is usually acidic. Since the film forming properties of a latex are improved when on the alkaline side, the pH of the latex is raised with ammonium hydroxide or similar base before deposition.

The process of this invention involves two sequential polymerizations in the same aqueous system. In the first polymerization the monomeric material consisting of at least 10 percent of the acrylic monomer is dispersed and polymerized to give a latex having lower non-volatile solids content and smaller particle sizes than is desired in the final latex. Following that polymerization additional monomeric material having less than 10 percent of the acrylic monomer is thoroughly dispersed into the first latex in such a manner that no new particles are formed and polymerized to result in the latex of the desired non-volatile solids content and particle sizes. This latex, following the second polymerization, forms either plasticized or unplasticized films which are easily dried and processed to less than 1 percent by weight of water by usual drying techniques.

In carrying out this process it has been found that the second monomeric material must constitute at least 10 percent of the weight of total monomer. When less than 10 percent of the total monomer is the second monomeric material containing less than 10 percent of the acrylic monomer there is little improvement shown in the drying characteristics of cast films. It has been further found that the second monomeric material should not constitute over half of the total monomers used and preferably should be less than 30 percent of the weight of total monomers. When the second monomers are used in a concentration of much over 30 percent, the properties of the cast films are dependent to a significant extent upon the composition of the second monomeric material which does not result in the desired partially crystalline or amorphous copolymer. The optimum concentration of second monomeric material within the preferred range of from 10 to 30 percent, for a particular purpose, may be determined by simple preliminary experiment.

The operability of this process is attributable in large part to the coating of the individual particles of the latex of the first polymerization by the second monomeric material. Thus the second polymerization increases both the non-volatile solids of the first latex and also the individual particle sizes. It follows therefore that the nature and concentration of ingredients and polymerization conditions employed in preparing the first latex should be so chosen as to provide not only somewhat less than the desired amount of solids but also individual particle sizes that are smaller than those finally desired.

The process may be conveniently carried out by preparing the total aqueous phase that is to be used by dissolving the catalyst and only enough of the emulsifier that is to be used in forming the desired small particles in the full amount of water. The first monomeric material is dispersed into that aqueous phase and polymerized by heating the dispersion to from 35 to about 70° C. while agitated until polymerization is substantially complete. Into that latex is then dispersed without forming any substantial number of new particles the premixed second monomeric material and the dispersion is again heated to from 35 to 70° C. while agitated to cause polymerization. After cooling, filtering, stabilizing, and formulating, if desired, the latex is ready for casting into films.

The latexes resulting from this process consist of laminar particles wherein the core which preferably constitutes at least 70 percent of the polymer of each particle is of higher acrylate content than the outer shell. Thus the particles have essentially the desired composition of monomers to produce a partially crystalline film and also have the good drying and processing characteristics of the porous coagula prepared from hard, highly crystalline copolymers.

It is known that colloidal systems such as polymer latexes may change on aging, resulting in reduced film forming properties, coagulation, polymer degradation, and the like. Accordingly it is preferred to carry out the second polymerization as soon as possible following completion of the first polymerization.

The operation and advantages of this process will be more apparent from the following illustrative example wherein all parts and percentages are by weight.

*Example*

Into an aqueous phase consisting of 90 parts water, 1.5 parts of a dialkyl ester of sodium sulfosuccinic acid, and 0.38 part of potassium persulfate was dispersed 72 parts of a first monomeric material composed of 89 percent vinylidene chloride and 11 percent butyl acrylate. The dispersion was heated to 50° C. while agitated until polymerization was substantially complete. Into that first latex was dispersed 18 parts of a second monomeric material composed of 95 percent vinylidene chloride and 5 parts of butyl acrylate and polymerization again conducted at 50° C. until completed.

An emulsion of 4.5 parts of ethyl phthalyl ethyl glycolate as a plasticizer in 4.5 parts of water to which had been added 1 percent of a dialkyl ester of sodium sulfosuccinic acid was prepared and stirred into the latex.

A film was prepared from the latex by deposition on a steel roll coated with a phenolic resin that was wetted with a 10 percent calcium chloride solution, resulting in a continuous coagulum. The coagulum was dried to a moisture content of less than 1 percent by forced heated air and finally fused at 150° C.

By way of contrast, when a latex was prepared in the conventional batchwise manner by dispersing all of the monomers, composed of 89 percent vinylidene chloride and 11 percent butyl acrylate into all of the aqueous phase and carrying the polymerization to completion, and the resulting latex coagulated in the same way, the coagulum could not be dried below a moisture content of 7 percent without fusion occurring.

The same results were observed when the procedures were repeated using vinyl chloride in place of vinylidene chloride and acrylonitrile, methyl or ethyl acrylate or methacrylate in place of butyl acrylate.

We claim:

1. A process for preparing latexes having improved drying characteristics when deposited as films comprising as essential sequential steps the forming of a first aqueous emulsion of a first monomeric material composed of a chloroethylene monomer selected from the group consisting of vinylidene chloride and vinyl chloride and an acrylic monomer selected from the class consisting of alkyl acrylates having from 1 to 4 carbon atoms in the alkyl group, alkyl methacrylates having from 1 to 4 carbon atoms in the alkyl group, and acrylonitrile and in which said acrylic monomer is present in an amount of at least 10 percent of the weight of said first monomeric material, in an aqueous phase; polymerizing the first emulsion of first monomeric material, while the emulsion is being agitated, to form a first polymer latex; then dispersing into said first latex from 10 to 30 percent of the total weight of monomers used of a second monomeric material composed of a chloroethylene monomer, selected from the group consisting of vinylidene chloride and vinyl chloride, and an acrylic monomer selected from the group consisting of alkyl acrylates having from 1 to 4 carbon atoms in the alkyl group, alkyl methacrylates having from 1 to 4 carbon atoms in the alkyl group, and acrylonitrile, and wherein said acrylic monomer constitutes less than 10 percent of the weight of said second monomeric material; then polymerizing the second monomeric material in the presence of said first polymer latex, while said mixture is being agitated, until polymerization is complete.

2. The process claimed in claim 1, wherein said steps are carried out as one continuous uninterrupted sequence.

3. The process claimed in claim 1 wherein said haloethylene monomer is vinylidene chloride.

4. The process claimed in claim 1 wherein the monomers forming said first monomeric material and said second monomeric material are the same.

5. An aqueous film-forming polymer latex prepared by the process of claim 1.

References Cited in the file of this patent
FOREIGN PATENTS 627,265    Great Britain _____ Aug. 4, 1949